(12) United States Patent
Flechl

(10) Patent No.: US 10,008,815 B2
(45) Date of Patent: Jun. 26, 2018

(54) PLUG-IN CONNECTION AND METHOD FOR CONNECTING, IN PARTICULAR, ELECTRICAL LINES

(71) Applicant: Christian Flechl, Graz (AT)

(72) Inventor: Christian Flechl, Graz (AT)

(*) Notice: Subject to any disclaimer, the term of this patent is extended or adjusted under 35 U.S.C. 154(b) by 0 days. days.

(21) Appl. No.: 15/547,344

(22) PCT Filed: Feb. 1, 2016

(86) PCT No.: PCT/AT2016/050021
§ 371 (c)(1),
(2) Date: Jul. 28, 2017

(87) PCT Pub. No.: WO2016/119001
PCT Pub. Date: Aug. 4, 2016

(65) Prior Publication Data
US 2017/0365959 A1 Dec. 21, 2017

(30) Foreign Application Priority Data
Jan. 30, 2015 (AT) .............................. A 50077/2015

(51) Int. Cl.
*H01R 24/38* (2011.01)
*H01R 13/642* (2006.01)
(Continued)

(52) U.S. Cl.
CPC ........... *H01R 24/38* (2013.01); *H01R 13/508* (2013.01); *H01R 13/635* (2013.01);
(Continued)

(58) Field of Classification Search
CPC ....... H01R 24/38; H01R 13/44; H01R 13/642
(Continued)

(56) References Cited

U.S. PATENT DOCUMENTS

| 3,808,577 A | 4/1974 | Mathauser |
| 2009/0280673 A1 | 11/2009 | Kohen |
| 2015/0336677 A1 | 11/2015 | Smaoui et al. |

FOREIGN PATENT DOCUMENTS

| CN | 102 035 093 | 4/2011 |
| DE | 80 34 798 | 8/1981 |

(Continued)

OTHER PUBLICATIONS

Austria Office Action conducted in counterpart Austria Appln. No. A 50077/2015 (dated Oct. 9, 2015) (w/ Machine translation).

*Primary Examiner* — Ross Gushi
(74) *Attorney, Agent, or Firm* — Greenblum & Bernstein, P.L.C.

(57) ABSTRACT

The invention relates to a plug-in connection (1) for connecting, in particular, electrical lines, comprising at least a female connecting element (2) and a male connecting element (3), wherein the female connecting element (2) interlockingly receives the male connecting element (3) and wherein the two connecting elements (2, 3) can be detachably frictionally connected while in interlocking contact, wherein a region (4) of the male connecting element (3) that enters into connection is coaxially tapered and comprises at least one slidable contact body (5), which is arranged within the male connecting element in a first position and protrudes from the male connecting element (3) in a second position. The invention further relates to a use of such a plug-in connection (1). The invention further relates to a method for connecting, in particular, electrical lines by means of a plug-in connection (1).

19 Claims, 6 Drawing Sheets

Figure 1:
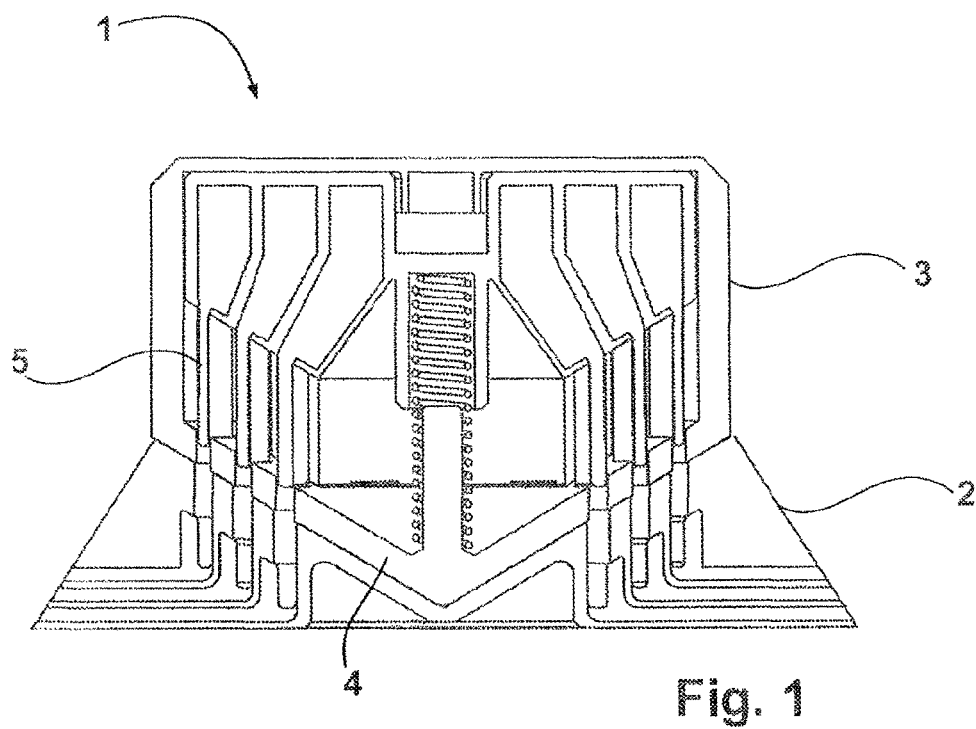

(51) Int. Cl.
*H01R 13/639* (2006.01)
*H01R 13/508* (2006.01)
*H01R 13/635* (2006.01)
*H01R 105/00* (2006.01)

(52) U.S. Cl.
CPC ......... *H01R 13/639* (2013.01); *H01R 13/642* (2013.01); *H01R 2105/00* (2013.01); *H01R 2201/26* (2013.01)

(58) Field of Classification Search
USPC .................................................. 439/131, 172
See application file for complete search history.

(56) References Cited

FOREIGN PATENT DOCUMENTS

| | | |
|---|---|---|
| EP | 2 533 374 | 12/2012 |
| EP | 2 595 252 | 5/2013 |
| KR | 2011 0077444 | 7/2011 |
| WO | 2014/096144 | 6/2014 |

PLUG-IN CONNECTION AND METHOD FOR CONNECTING, IN PARTICULAR, ELECTRICAL LINES

The invention relates to a plug-in connection for connecting in particular electrical lines, comprising at least one female connecting element and one male connecting element, wherein the female connecting element receives the male connecting element in an interlocking manner, and wherein the two connecting elements can be detachably frictionally connected while in interlocking contact.

In addition, the invention relates to a use of a plug-in connection of this type.

Furthermore, the invention relates to a method for connecting in particular electrical lines by means of a plug-in connection, wherein at least one male connecting element is received in an interlocking manner by at least one female connecting element and the connecting elements are detachably frictionally connected while in interlocking contact.

From the prior art, a number of plug-in connections are known for connecting and detaching electrical lines in particular. A common feature of all plug-in connections is that they comprise a male connecting element and a female connecting element.

In a plug-in connection known from the prior art, outward-facing contact pins are provided on the male connecting element. To ensure a desired stability of these contact pins, the pins are normally embodied to be thick or with a relatively large respective diameter. The female connecting element of a plug-in connection of this type comprises contact openings which receive the contact pins in an interlocking manner. When the connecting elements of the plug-in connection are joined, they must be precisely positioned so that the male connecting element, or the contact pins thereof, can be plugged into the female connecting element, or the contact openings thereof. To enable an undisturbed transmission of voltage or a stability of the plugged-in connection, a plug-in connection of this type is connected frictionally when interlocking contact is present, which can be relatively effortful. This is especially the case if heavy cables are to be connected to one another or to a socket, for example when charging an electric vehicle.

The object of the invention is to specify a plug-in connection of the type named at the outset in which the male connecting element can be connected to the female connecting element in a simple manner and with a secure hold.

A further object of the invention is to specify a use of a plug-in connection of this type.

Another object is to specify a method of the type named at the outset with which a male connecting element and a female connecting element of a plug-in connection can be connected to one another in a simple manner and with a secure hold.

The object is attained according to the invention in that, for a plug-in connection of the type named at the outset, a region of the male connecting element that enters into connection is embodied in a coaxially tapering manner and comprises at least one slidable contact body which is arranged within the male connecting element in a first position and protrudes from the male connecting element in a second position.

One advantage achieved with the invention can in particular be seen in that the connecting elements are interlockingly joinable in a simple manner due to the embodiment of the connecting elements. For the joining of the connecting elements, it can thereby be provided that the contact body of the male connecting element is arranged within the male connecting element in the first position. In this manner, the interlocking connection of the connecting elements occurs in a simple manner and independent of a position in which the two connecting elements meet. A precise positioning of the male connecting element in the female connecting element is thus not necessary. Furthermore, the at least one contact body of the male connecting element can be embodied to be thin or does not need to have a specific minimum thickness, since the contact body is arranged within the male connecting element when the two connecting elements are joined and can only be slid into a second position after interlocking contact, in order to produce full contact. The connecting elements are preferably embodied in a dimensionally stable manner from a material suitable therefor. The region of the male connecting element that enters into connection can, for example, be embodied as a cone or in a conically tapering manner, a hemispherical shape, or a pyramidal shape. The female connecting element is then embodied such that this element receives the male connecting element in an interlocking manner.

It can thereby be preferably provided that, while the two connecting elements are in interlocking contact, the contact body of the male connecting element can be connected interlockingly to at least one contact layer of the female connecting element with an application of force, wherein a connection region is disposed within the female connecting element. In particular, it can thereby be provided that multiple contact bodies are arranged within the male connecting element, which bodies are preferably arranged congruously with the contact layers in the female connecting element, preferably coaxially with one another. It is favorable if the contact bodies are always arranged within the male connecting element and can only be partially pushed or slid out of the male connecting element after the male connecting element is received interlockingly by the Female connecting element, in order to prevent a bending of the contact bodies or the like. In a position partially outside of the male connecting element or a position in which a shape of the male connecting element changes, the contact bodies are, in the direction of the region of the male connecting element that enters into connection, respectively bounded in all directions by this element, wherein the region that enters into connection is preferably made of an in particular electrically nonconductive material or an insulating material. The contact bodies can thus externally be in particular electrically insulated, except for one region necessary for producing contact.

It is advantageous if the contact body and the contact layer of the respective connecting elements are essentially round in a cross-section through the elements. It can thereby also be provided that each round or ring-shaped contact body is respectively composed of multiple, for example three or six, sections or segments. Due to the ring-shaped embodiment of the at least one contact body, this body can be embodied to be thin or have a small thickness, for example thinner than 2 mm, in particular approximately 1 mm or less, and still have a large cross-sectional area, since a circumferential length of the contact body is at least one order of magnitude larger than the thickness thereof. Because of the large cross-sectional area, a large charging capacity can be achieved for example during a transmission of electrical energy, which can reduce a charging duration. Charging can thereby include both a charging and also a discharging of a storage unit. The at least one contact layer of the female connecting element is then embodied in a correspondingly round or circular manner. If multiple contact bodies and contact layers are provided, these can preferably be arranged coaxially, in particular around an end of the region of the male connecting element that enters into connection, or coaxially around a corresponding part of the female connecting element.

It can advantageously be provided that a multiphase electrical connection is present, wherein for each phase respectively one contact body that is essentially round in cross-section through the connecting elements is provided per male connecting element and one essentially round contact layer is provided per female connecting element, and wherein these contact bodies and layers are respectively arranged offset from one another in cross-section through the connecting elements. Furthermore, it is advantageous if these contact bodies and layers are arranged coaxially with one another, wherein a distance between each pair of contact bodies and contact layers can vary. If the plug-in connection is designed for a transmission of electrical energy, three or five contact bodies and contact layers can accordingly be provided depending on whether a three-phase or five-phase connection is to be produced for a transmission of alternating voltage or alternating current or three-phase current. For a transmission of direct current voltage, two male connecting elements can be provided, in which respectively one contact body with one phase each is arranged. Accordingly, two female connecting elements can be provided to receive the male connecting elements and can accordingly each comprise one contact layer having one phase. For a transmission of three-phase current with three phase conductors, one neutral conductor and one protective ground conductor, a protective ground conductor contact can be embodied such that a contact of the same takes place within the female connecting element before all other conductor contacts. For this purpose, the protective ground conductor contact can for example be embodied such that it is longer than the other conductor contacts, whereby the protective ground conductor contact is the last conductor contact to be disconnected from the female connecting element.

For a three-phase connection, in addition to the three recesses having respectively one contact body or one contact layer per connecting element, two other recesses for a protective ground conductor and a neutral conductor and also one or two additional recesses can also be provided. In these recesses, signal lines or signal contacts can expediently be arranged for a communication between an electrical vehicle and a charging station, for example. It is particularly favorable if only one additional recess is for example provided for two signal contacts, which recess is further divided, or in which recess two signal contacts are arranged for example over one another with insulation between them, in order to separate the two signal contacts from one another. When the two connecting elements are joined, the signal contacts are conductively connected to one another. Little to virtually no energy is transmitted via the signal contacts, which is why they are accordingly embodied to be thin or thinner than the contact bodies and contact layers for the transmission of voltage and current.

It can be provided that multiple female connecting elements are arranged on an electrical vehicle as contact plates. It is thereby necessary to interrupt the signal lines or signal contacts at the charging connection of the electrical vehicle as soon as the contact bodies and contact layers are connected for the transmission of voltage and current, in order to avoid a simultaneous charging of the electric vehicle via the charging connection thereof and the contact plate. If this does not take place, a short circuit may result during the charging process for the electric vehicle.

Another version is characterized by a single-phase energy transmission or connection. In a single-phase connection, coaxial recesses for a phase conductor and for a neutral conductor and protective ground conductor are arranged within the female connecting element. In addition, one or two other recesses are also provided for signal lines. In this case, however, it is expedient if the three-phase power network produced in a connection of the two connecting elements is not loaded asymmetrically, since in this type of scenario only a certain amount of power can be transmitted via the network. In a single-phase design of this type, the contact bodies and contact layers of the connecting elements are advantageously sized to be large or with a large volume, so that large or high currents can flow or be transmitted. Furthermore, the two current-carrying contacts can be used as a positive and negative pole for a direct current charge.

It is particularly advantageous if the connecting elements are each embodied conically on a joinable side, wherein a region of the male connecting element that enters into connection is embodied such that, when the region is joined with the female connecting element, it automatically engages with said element. For this purpose, it can be provided that the region of the male element that enters into connection, or a positioning cone, of the male element is embodied in a tapered manner, and that the female connecting element widens conically. This embodiment of the connecting elements and the positioning of the at least one contact body within the male connecting element allows a joining of the two connecting elements independent of their position relative to one another. A rotation of the connecting elements about their longitudinal axis or z-axis does not play a role. In addition, a tilting of one of the connecting elements also does not impede an interlocking joining, since the male connecting element is advantageously embodied such that it slips into the female connecting element. The two connecting elements can be joined by hand, for example. Alternatively, one or both connecting elements can be arranged on a device that joins the connecting elements. To move into a final position in the female connecting element, it can be expedient if the male connecting element can be deflected about one or two axes. If the connecting elements are joined by hand, one hand performs a deflection of this type. If a device for joining the connecting elements is present, the male connecting element can be arranged on the device such that it can be deflected on one or more axes. Alternatively, the female connecting element can also be deflectable.

It is favorable if a height of the conical region of the male connecting element corresponds to a depth of the conical recess of the female connecting element. It is further preferable that the male connecting element be embodied with a contact surface that is arranged on the base of the cone and extends outwards such that it lengthens the base. As a result of the contact surface, the male connecting element can, even if it is joined somewhat crookedly with the female connecting element, move into an interlocking position in the female connecting element, since the male connecting element is automatically pushed straight due to the contact surface.

For this purpose, it can in particular be favorable that an end of the region of the male connecting element that enters into connection is embodied in a blunt manner. It is thus ensured that the male connecting element can be positioned in the female connecting element in an interlocking manner. The blunt tip thereby allows an automatic and flexible engagement of the male connecting element with the female connecting element. With an embodiment of this type, it is not necessary to overcome a large resistance. In particular in the case of an imprecise impact of the male connecting element on the female connecting element, an automatic engagement with the female connecting element is enabled by the shape of the male connecting element or the region thereof that enters into connection. Particularly preferably, the end of the male connecting element comprises a hemispherically shaped rounding with a radius of less than 5 mm, in particular 1 mm or less. When selecting a material for the male connecting element, it should in particular be ensured that the material has the requisite hardness so that a potential material abrasion during the joining is minimized. For this purpose, a surface of the connecting element can be coated, for example with polytetrafluoroethylene (PTFE), wherein it is thereby favorable if a surface of the positioning elements is also coated with PTFE in order to minimize a friction coefficient during the joining.

According to the invention, it can furthermore be provided that the region of the male connecting element that enters into connection is embodied as a cone or a taper and has an angle or a conical reduction in the range from 50° to 80°, in particular in the range from 55° to 75°, preferably approximately 65°. When joined with or bearing against the female connecting element, the region thus slips particularly well into the female connecting element, and little frictional resistance must be overcome.

It is also advantageous if the female connecting element is arranged in a polygonal, particularly in a hexagonal, cell. For this purpose, it can be further provided that the cell comprises an in particular conical recess having a vertex in a center point of the cell. A diameter of the cell can thereby be approximately 40 mm to 120 mm, for example 70 mm. The recess thereby preferably comprises an entire height or thickness of the female connecting element, which for example can be 10 mm to 30 mm high or thick. An angle of the recess can be in the range from 15° to 35°, in particular in the range from 20° to 30°, preferably approximately 25°. Through this embodiment, it is possible to arrange multiple female connecting elements next to one another in a space saving manner, for example on a plate that is divided into hexagonal cells. An arrangement in a row is also possible.

It is expedient if a spring is provided for the frictional connection of the connecting elements, in order to produce the frictional connection and release it again in a simple manner. It can thereby be provided, for example, that the spring is arranged within the male connecting element, and that the spring is arranged on a side of the male connecting element that is opposite of the end of the positioning cone. As an alternative to the spring, another means of producing a frictional connection can be provided, for example a clamp or a screw. The spring allows a simple production of a frictional connection with a small amount of force.

Furthermore, it is expedient if, on a side opposite of the tip or the end of the positioning cone, a pressure device for actuating the spring is provided, with which device the contact bodies can be brought out of the positioning cone of the male connecting element by an application of force, wherein the contact bodies are preferably releasably fixable in this position outside of the male connecting element. For this purpose, recesses can be provided in the male connecting element or the region thereof that enters into connection. Furthermore, an embodiment is possible wherein the contact bodies can be released from this position and returned to their initial position within the male connecting element by a further actuation of the pressure device.

According to the invention, it can also be provided that the interlocking connection between the male connecting element and the female connecting element takes place in a first step, after which, preferably simultaneously with a production of a contact between the at least one contact layer and the at least one contact body, the two connecting elements can be detachably frictionally connected. A transmission, for example of electrical energy, data, sound or light, can only take place after these steps have been completed. For this, at least one magnet can for example be provided which ensures that the positioning cone of the male connecting element is aligned on or in the female connecting element such that the contact bodies cannot be slid out of the male connecting element prematurely, which would impede an alignment of the positioning cone.

Furthermore, a first mechanical contact probe or sensor can be provided that determines whether the contact bodies have been fully slid out of the male connecting element. In addition, a second contact probe or sensor can be present which for example can be arranged externally on the positioning cone of the male connecting element and is actuated on contact with the female connecting element. Both sensors or contact probes can preferably be connected to one another by an AND operation, whereby both must be actuated in order to allow any flow of current, for example. Furthermore, these sensors also enable an immediate interruption of the current flow when the connecting elements are separated from one another.

It is advantageous if, in each connecting element, multiple contact bodies and/or contact layers are provided which are respectively arranged alternatingly with insulating layers, wherein the insulating layers of both connecting elements bear against one another during interlocking contact. As a result, a conductive connection is not yet produced upon interlocking contact, and undesired electrical flashovers or contacts are avoided. If a three-phase connection for the transmission of alternating voltage is to be produced between the female connecting element and the male connecting element, it can advantageously be provided that three contact layers are arranged in a ring shape or coaxially in the female connecting element. Through the ring-shaped embodiment of the contact layers and contact bodies, the layers and bodies can be embodied to be thin, for example thinner than 2 mm, in particular approximately 1 mm or less, and still have a large cross-sectional area, since a circumferential length of the contact layer or contact body is at least one order of magnitude larger than the thickness thereof.

It is expedient if, in a cross-section through the female connecting element, an essentially round recess is provided in the female connecting element, in which recess the at least one contact layer of the same is arranged. Multiple hollow-cylindrical, coaxial recesses can be provided. According to the invention one, three or five recesses can be provided, for example. If multiple recesses are provided, it is advantageous if they are, relatively speaking, embodied in an approximately equally deep manner, wherein a recess that is arranged the farthest inward or most proximately to the vertex of the conical recess, extends the farthest in the direction of a lower end of the female connecting element.

Advantageously, it can be provided that contact layers are arranged in a cross-section through the female connecting element at a distance from the upper end of the same. This cross section thereby corresponds to a section transverse to a ring of the contact layers. It is thus in turn ensured that a conductive connection only takes place after an interlocking connection of the connecting elements has occurred. The insulating layers, on the other hand, extend all the way to an upper end of the connecting element, or they form the upper end.

Advantageously, one or more female connecting elements can be arranged on an electric vehicle. The female connecting element or the plug-in connection according to the invention thus allows a simple connection of a cable to a socket arranged on an electric vehicle, and in doing so facilitates a charging of an electric vehicle. In this manner, less force is necessary than in the prior art when joining the male connecting element with the female connecting element.

A use of a plug-in connection according to the invention advantageously occurs in the connection of power supply lines, in particular when charging an electric vehicle.

The method-related object is attained if, in a method of the type named at the outset, a coaxially tapered region of the male connecting element is connected to the female connecting element, after which at least one contact body of the male connecting element is released from a position within the same and is slid into a position protruding from the male connecting element, in order to connect the contact body of the male connecting element to at least one contact layer of the female connecting element.

One advantage of the method according to the invention can in particular be seen in that, by producing a conductive connection over multiple steps, a simple connection of the male connecting element to the female connecting element is achieved. The connecting elements are thereby advantageously embodied such that they can be interlockingly joined in any desired manner; for example, they can comprise conically embodied regions. The contact body of the male connecting element is thereby only slid out of said element after an interlocking connection of the connecting elements, whereby on the one hand a production of an unintended conductive connection between the connecting elements and on the other hand undesired mechanical loading of the contact body are avoided.

The two connecting elements can be joined by hand, for example. Alternatively, one or both connecting elements can be arranged on a device that joins the connecting elements. To move into a final position in the female connecting element, it can be expedient if the male connecting element is deflected about one or two axes. If the connecting elements are joined by hand, a deflection of this type is carried out by one hand. If a device for joining the connecting elements is present, the male connecting element can be arranged on the device such that it can be deflected on one or more axes. Alternatively, the female connecting element can also be deflected.

It is thereby expedient if, in an interlocking connection of the at least one contact body to the at least one contact layer in a contact region within the female connecting element, the two connecting elements are automatically detachably frictionally connected in particular by a spring. In particular, it can thereby be provided that the connection of the contact bodies is produced simultaneously with a frictional connection of the connecting elements. The at least one contact body is thus always arranged within the male connecting element, except during a production of a conductive connection. Simultaneously with the production of a conductive connection, the two elements are also frictionally connected to one another to enable an uninterrupted transmission of, for example, electrical energy or data. During a production of, for example, a three-phase electrical connection, three contact bodies are conductively connected to three contact layers of the female connecting element with an application of force.

It is advantageous if at least one contact body of the male connecting element that is embodied in an essentially round manner in a cross-section through said element is slid into at least one recess of the female connecting element that is embodied in an essentially round manner in a cross-section through said element, in order to connect the contact body to the contact layer of the female connecting element, which contact layer is arranged in the recess. Preferably, this is not carried out until after an interlocking connection of the two connecting elements, whereby an undesired contact and a bending of the contact bodies are prevented. It is thereby favorable if multiple coaxially arranged contact bodies are provided which are pushed into similarly coaxially embodied recesses of the female connecting element to produce a conductive connection. The contact bodies of the male connecting element can each be divided into multiple, for example into three or six, sections or segments. In the recesses of the female connecting element, one contact layer each is disposed, in the direction of which the contact bodies are slid.

It is thereby favorable if the connecting elements are frictionally connected by an application of a pressure to an upper side of the male connecting element in order to achieve a fixing in place of male connecting element in the female connecting element with a simple motion. For this purpose, a spring can be provided, for example. It is further advantageous if a force that is to be applied can be minimized.

Advantageously, it can be provided that, after the interlocking connection of the at least one contact body to the at least one contact layer and the frictional connection of the connecting elements, electrical energy is transmitted. Multiple contact bodies and contact layers can thereby be provided which, by means of the ring-shaped or circular form of the same, can be embodied to be thin and nevertheless have a large cross-sectional area, whereby a charging cycle of a consumer is carried out with a high charging capacity. It can thereby also be provided that, after a completion of the transmission of electrical energy, the frictional connection is preferably automatically released. This is in particular important when charging a storage unit for electrical energy in an electric vehicle, in order to increase convenience thereby and minimize human involvement.

Figure 2:
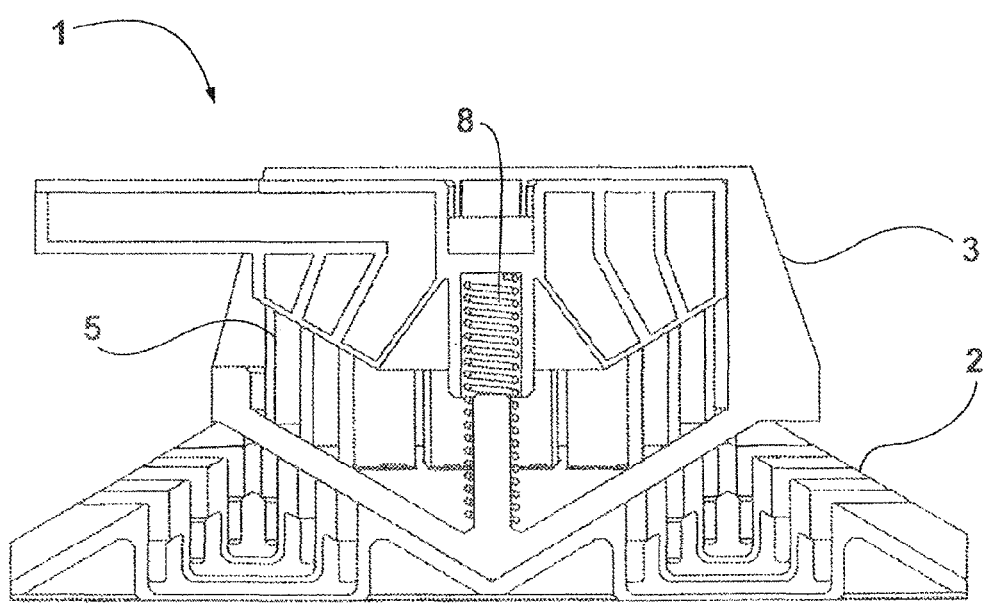
Figure 3:
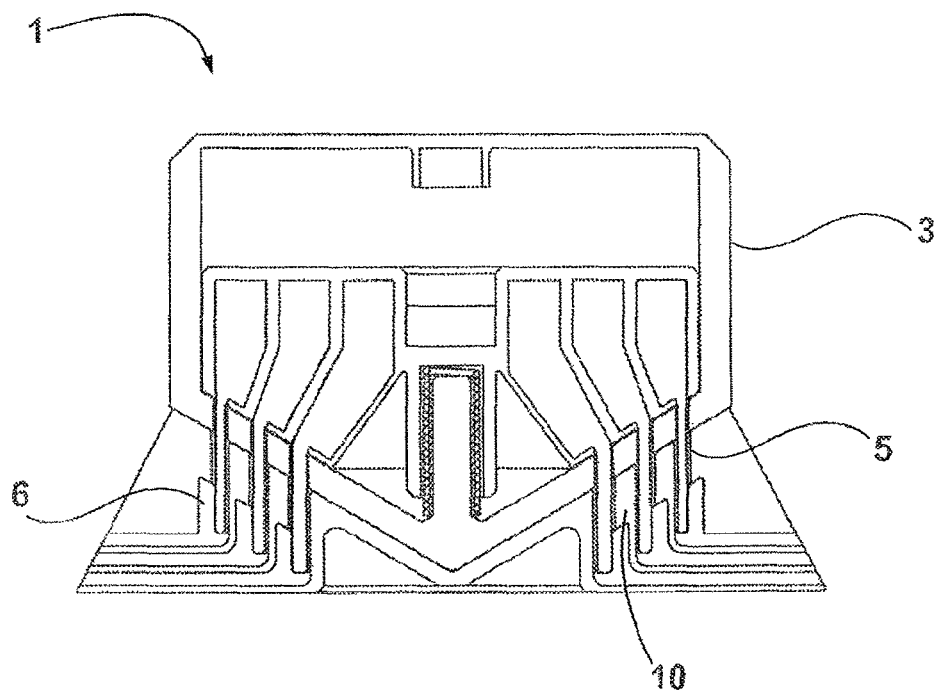
Figure 4:
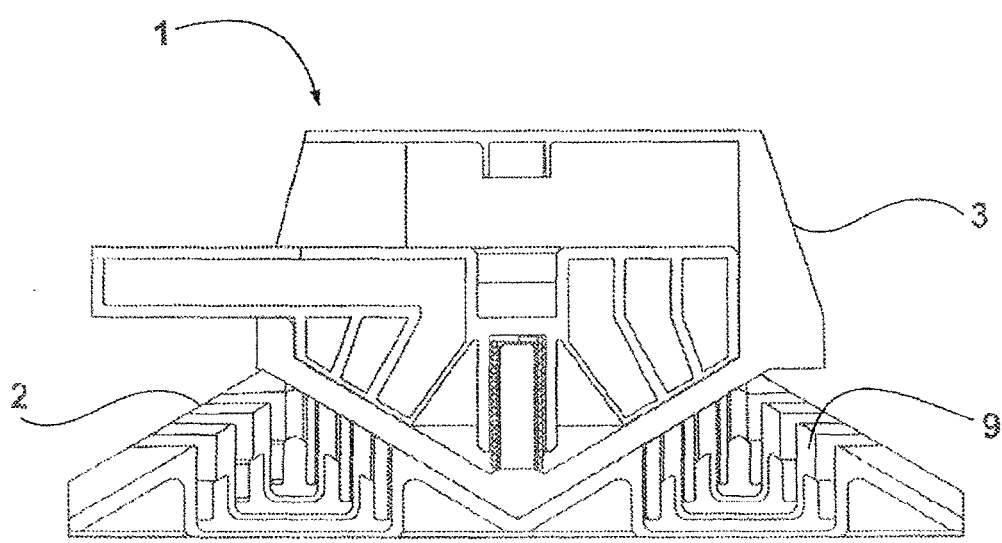
Figure 5A:
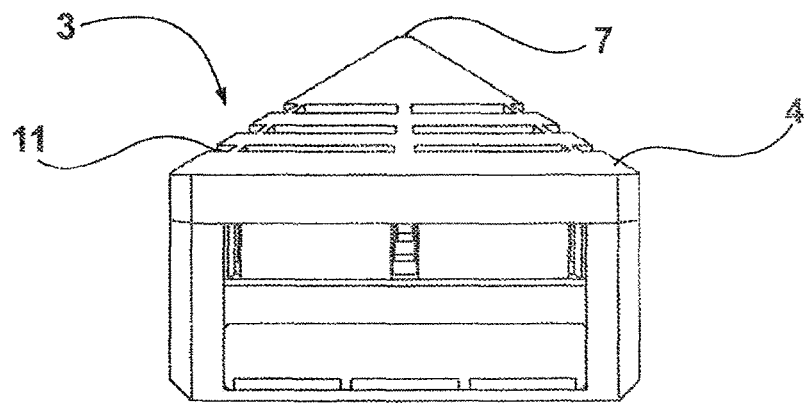
Figure 5B:
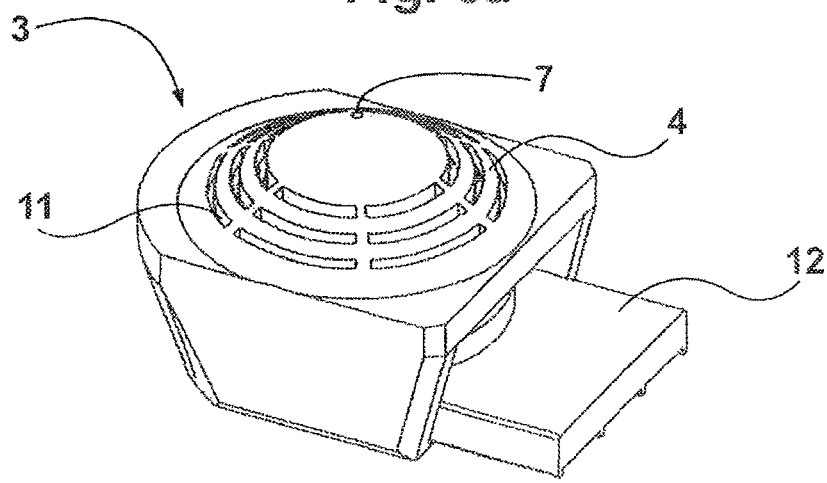
Figure 5C:
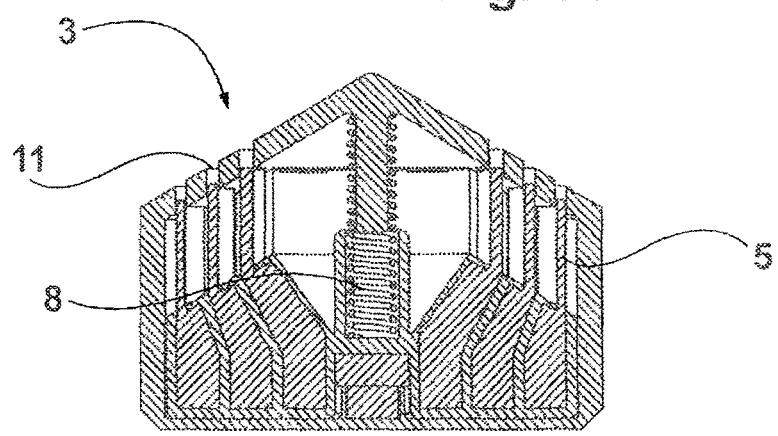
Figure 6A:
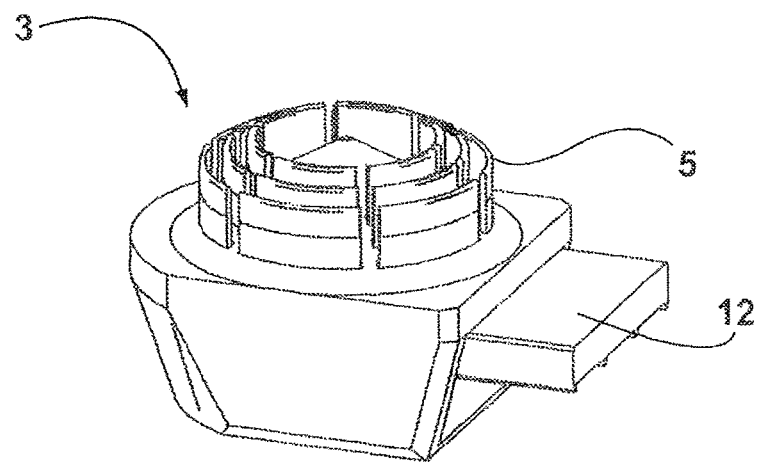
Figure 6B:
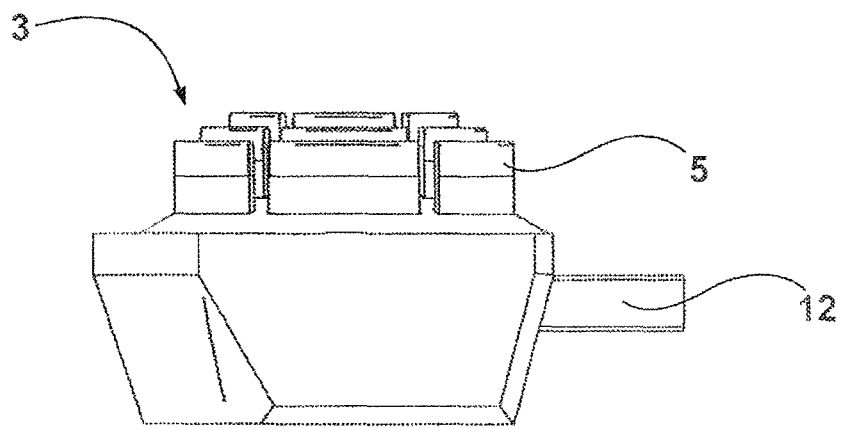
Figure 6C:
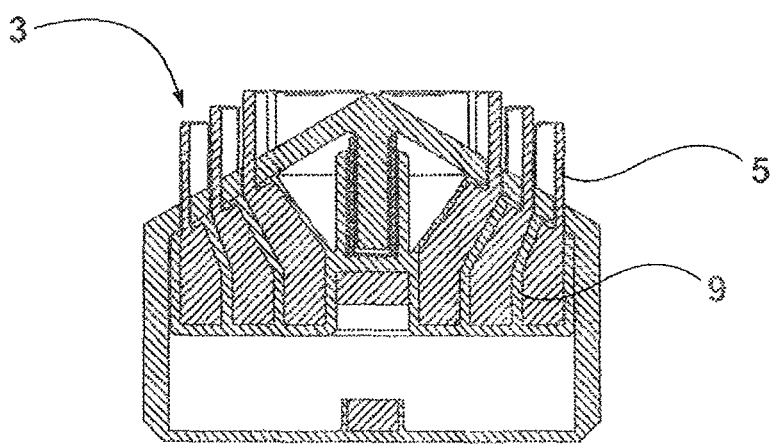
Figure 7A:
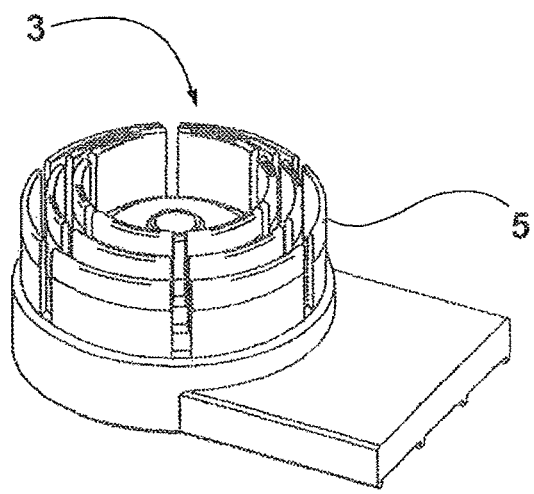
Figure 7B:
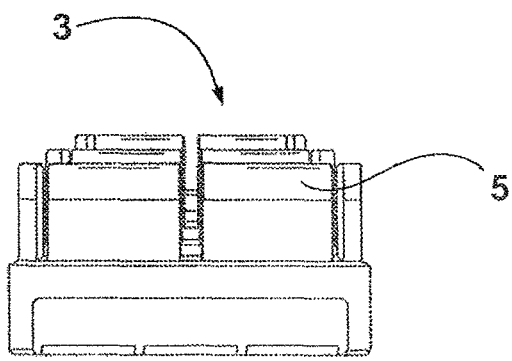
Figure 7C:
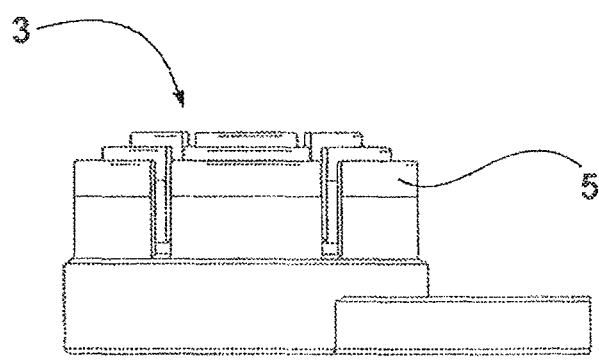
Figure 8:
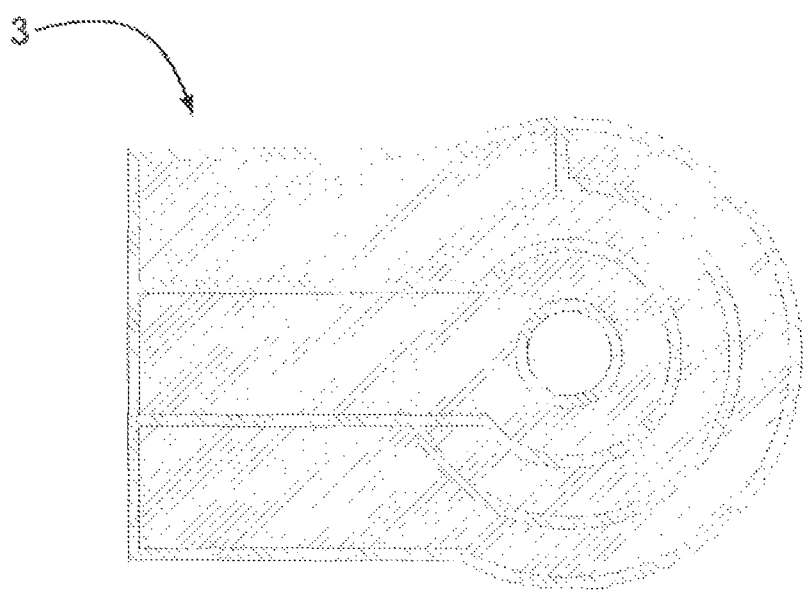

Additional features, advantages and effects of the invention follow from the exemplary embodiment described below. The drawings which are thereby referenced show the following:

FIG. 1 A section through a plug-in connection according to the invention;

FIG. 2 An additional view of a section through a plug-in connection according to the invention;

FIG. 3 A section through a plug-in connection according to the invention with connected contact bodies;

FIG. 4 An additional view of a section through a plug-in connection according to the invention with connected contact bodies;

FIG. 5a A view of a male connecting element;

FIG. 5b An additional view of a male connecting element;

FIG. 5c A section through a male connecting element according to FIG. 5a;

FIG. 6a A view of a male connecting element with displaced contact bodies;

FIG. 6b An additional view of a male connecting element with displaced contact bodies;

FIG. 6c A section through a male connecting element according to FIG. 6a;

FIG. 7a A conductive part of a male connecting element;

FIG. 7b An additional view of a conductive part of a male connecting element;

FIG. 7c An additional view of a conductive part of a male connecting element;

FIG. 8 A bottom view of a section through a male connecting element.

FIGS. 1 and 2 each show a section through a plug-in connection 1 according to the invention, which plug-in connection 1 comprises a female connecting element 2 and a male connecting element 3. The male connecting element 3 is thereby received in an interlocking manner by the female connecting element 2, wherein a region 4 of the male connecting element 3 that enters into connection is embodied in a coaxially tapering or conical manner. Furthermore, the male connecting element 3 according to FIGS. 1 and 2 comprises three contact bodies 5 which are arranged offset from one another and coaxially within the male connecting element 3 in a ring-shaped manner. Additionally, in the female connecting element 2, three contact layers 6 are provided which are likewise embodied in a ring-shaped and coaxial manner. These layers are preferably arranged in recesses 10 at a distance from an upper end of said recesses.

In FIGS. 1 and 2, it is additionally shown that the female connecting element 2 has a layered structure. For this purpose, it can preferably be provided that the contact layers 6 are respectively arranged alternatingly with an insulating layer 9. If there are three contact layers 6, four insulating layers 9 are provided which terminate the female connecting element 2 at the top and at the bottom. The insulating layers 9 are thereby made of an electrically nonconductive material, for example plastic. In FIGS. 1 and 2, a conductive connection between the contact bodies 5 and the contact layers 6 has not been produced.

FIGS. 3 and 4 each show a section through a plug-in connection 1 according to the invention, in which plug-in connection 1 a conductive connection between the female connecting element 2 and the male connecting element 3 has been produced. For this purpose, the contact bodies 5 are slidably disposed within the male connecting element 3 and, when the connecting elements 2, 3 are in interlocking contact, are slid into a position protruding from the male connecting element 3, wherein the bodies thus enter into connection with the contact layers 6 arranged in the female connecting element 2 in order to produce a conductive connection and then consequently to transmit voltage, for example. However, a plug-in connection 1 for transmitting data or light can also be provided.

FIGS. 5a through 5c respectively show a male connecting element 3 or a section through a male connecting element 3. The male connecting element 3 is embodied with the region 4 that enters into connection or with a positioning cone which, when joined with the female connecting element 2, is slid into said element. The region 4 that enters into connection is thereby preferably formed from an electrically nonconductive material with a certain strength so that it is not bent when joined with the female connecting element 2. It can be advantageously provided that the region 4 that enters into connection is embodied with a blunt end 7 or a blunt tip. As a result of the blunt end 7 of the region 4 that enters into connection, the male connecting element 3 can then also be joined with the female connecting element 2 when it impacts the female connecting element 2 in a non-optimal manner. For example, if the male connecting element 3 impacts the female connecting element 2 diagonally, the male connecting element 3 slips into the female connecting element 2 due to the blunt end 7 of the region 4 that enters into connection, or the positioning cone, and ultimately moves into an interlocking position in the conical recess 10 of the female connecting element 2. Furthermore, in the positioning cone, recesses 11 are provided through which the contact bodies 5 can be slid into a second position.

In the section through the male connecting element 3 according to FIG. 5c, a spring 8 is provided for producing a frictional connection of the connecting elements 2, 3 or a conductive connection between the contact bodies 5 and the contact layers 6. During an actuation of the spring 8, the contact bodies 5 are slid out of the region 4 that enters into connection, or the positioning cone. As an alternative to the spring 8, another means of producing a detachable frictional connection can be provided, for example a clamp or a screw.

Furthermore, it is expedient if, on a side opposite of the tip or the end 7 of the positioning cone, a pressure device 12 for actuating the spring 8 is provided, with which device the contact bodies 5 can, by an application of force, be brought out of the region 4 of the male connecting element 3 that enters into connection, wherein the contact bodies 5 are preferably releasably fixable in this position outside of the male connecting element 3. It can thereby be provided that the contact bodies 5 can be released from this position and returned to their initial position within the male connecting element 3 by a further actuation of the pressure device 12. In FIG. 5b, the pressure device 12 is shown in an initial position or released position.

A second position of the contact bodies 5 of the male connecting element 3 is shown in FIGS. 6a through 6c. The contact bodies 5 are thereby slid out of the region 4 that enters into connection, in order to produce a conductive connection during or after interlocking contact of the male connecting element 3 with the female connecting element 2. Preferably simultaneously with a production of the conductive connection, a frictional connection of the connecting elements 2, 3 occurs in order to maintain without interruption the connection for a duration of a transmission of voltage or data, for example. To do so, the pressure device 12 is actuated.

FIGS. 7a through 7c show a conductive part of a male connecting element 3. It has proven successful that each coaxial contact body 5, as shown in FIGS. 7a through 7c, is divided into six sections or segments in order to increase a flexibility of the contact bodies and thus to increase a transition contact with the female connecting element 2. However, a different number of segments of contact bodies 5 can also be provided, for example three. It is however favorable if the contact body 5 is divided into six or more segments. Furthermore, the contact bodies 5 can comprise an upper, conductive region and a lower, insulating region. Through the coaxial embodiment of the contact bodies 5, the bodies can be embodied to be thin, for example thinner than 2 mm, in particular approximately 1 mm or less, and still have a large cross-sectional area, since a circumferential length of the respective contact body 5 is at least one order of magnitude larger than the respective thickness thereof. Because of the large cross-sectional area, a large charging capacity can be achieved during a transmission of electrical energy, which can reduce a charging duration during the charging of a consumer.

In FIG. 8, a bottom view of a section through a male connecting element 3 is shown. Connections or lines adjoining the contact bodies 5 and the pathways thereof are thereby shown. It is favorable if a transition between the hollow-cylindrical contact bodies 5 and the connections is embodied with a largest possible continuous cross section.

In all FIGS. 1 through 8, the plug-in connection 1 is embodied such that it can be used to transmit three-phase alternating voltage. Each of the contact bodies 5 and contact layers 5 arranged in a ring-shaped manner thereby corresponds to one phase. However, the plug-in connection 1 can thereby also be embodied such that it can be used to transmit five-phase alternating voltage. For this purpose, five contact bodies 5 can be arranged in the male connecting element 3 and five contact layers 6 in the female connecting element 2, wherein each contact body 5 and each contact layer 6 then represents one phase.

A plug-in connection 1 according to the invention can also be embodied for a transmission of direct current. For this purpose, two male connecting elements 3 and two female connecting elements 2 can be provided, in each of which one contact body 5 and one contact layer 6 having one phase each is arranged, respectively.

Furthermore, the plug-in connection 1 can also be embodied such that it can be used to transmit data or light.

In a method according to the invention for connecting in particular electrical lines, a female connecting element 2 is joined with a male connecting element 3 in order to ultimately produce a conductive connection. In addition to the connection of electrical lines, lines for transmitting data or light, for example, can also be connected to one another with the method according to the invention.

To do so, a region 4 that enters into connection, or a positioning cone, of the male connecting element 3 is in a first step interlockingly joined with the female connecting element 2. As a result of the region 4 of the male connecting element 3 that enters into connection being embodied in a coaxially tapering or conical manner, the region 4 slips, even when non-optimally joined with the female connecting element 2, into said element and is thus positioned in the desired position. For this purpose, the female connecting element 2 is embodied such that the male connecting element 3 is interlockingly received by said element. An end 7 or a tip of the positioning cone can be embodied in a blunt manner, so that the slipping of the male connecting element 3 is facilitated.

The two connecting elements 2,3 are joined by hand, for example. Alternatively, one or both connecting elements 2, 3 can be arranged on a device that joins the connecting elements. To move into a final position in the female connecting element 2, it can be expedient if the male connecting element 3 is deflected about one or two axes. If the connecting elements 2, 3 are joined by hand, a deflection of this type is carried out by one hand. If a device for joining the connecting elements 2, 3 is present, the male connecting element 3 can be arranged on this device such that it can be deflected on one or more axes. Alternatively, the female connecting element 2 can also be deflected.

After the interlocking connection of the two connecting elements 2, 3, if multiple contact bodies 5 that are arranged within the positioning cone in the male connecting element 3 are present, they are slid into a position protruding from the male connecting element 3. For this purpose, recesses 11 are provided in the region 4 that enters into connection, through which recesses 11 the contact bodies 5 are slid or move forward. To produce a conductive connection, the contact bodies 5 are brought into connection with at least one contact layer 6 of the female connecting element 2. If multiple contact layers 6 are present, they are disposed in recesses 10 of the female connecting element 2, wherein the layers terminate at a distance from an upper end of the female connecting element 2. Insulating layers 9 are preferably arranged between the contact layers 5 to prevent flashovers or the like.

It is expedient if the frictional connection of the connecting elements 2, 3 is produced by means of a spring 8. It can thereby be provided that the spring 8 is arranged within the male connecting element 3 on a side of the male connecting element 3 that is opposite of the positioning cone. As an alternative to the spring 8, the frictional connection can also be produced by another means, for example by a clamp or a screw. A production of the frictional connection or an actuation of the spring 8 can be carried out by means of a pressure device 12.

The invention claimed is:

1. A plug-in connection for connecting in particular electric lines, comprising at least one female connecting element and one male connecting element, wherein the female connecting element receives the male connecting element in an interlocking manner, and wherein the two connecting elements are detachably frictionally connected while in interlocking contact, wherein a region of the male connecting element that enters into connection is embodied in a coaxially tapering manner and comprises at least one slidable contact body which is arranged within the male connecting element in a first position and protrudes from the male connecting element in a second position.

2. The plug-in connection according to claim 1, wherein, while the two connecting elements are in interlocking contact, the at least one contact body of the male connecting element can be interlockingly connected to at least one contact layer of the female connecting element with an application of force, wherein a connection region is disposed within the female connecting element.

3. The plug-in connection according to claim 1, wherein the contact body and the contact layer of the respective connecting elements are essentially round in a cross-section through the elements.

4. The plug-in connection according to claim 3, wherein a multiphase electrical connection is present, wherein for each phase respectively one contact body that is essentially round in a cross-section through the connecting elements is provided per male connecting element and one essentially round contact layer is provided per female connecting element, and wherein these contact bodies and layers are respectively arranged offset from one another in cross-section through the connecting elements.

5. The plug-in connection according to claim 1, wherein the connecting elements are each embodied conically on a joinable side, wherein the region of the male connecting element that enters into connection is embodied such that, when the region is joined with the female connecting element, it automatically engages with said element.

6. The plug-in connection according to claim 5, wherein an end of the region of the male connecting element that enters into connection is embodied in a blunt manner.

7. The plug-in connection according to claim 5, wherein the female connecting element is arranged in a polygonal, particularly in a hexagonal, cell.

8. The plug-in connection according to claim 1, wherein a spring is provided for the frictional connection of the connecting elements.

9. The plug-in connection according to claim 1, wherein, in each connecting element, multiple contact bodies and/or contact layers are provided, which are respectively arranged alternatingly with insulating layers, wherein the insulating layers of both connecting elements bear against one another during interlocking contact.

10. The plug-in connection according to claim 1, wherein, in a cross-section through the female connecting element, at least one essentially round recess is provided in said element, in which recess the at least one contact layer of the female connecting element is arranged.

11. The plug-in connection according to claim 10, wherein contact layers are arranged in a cross-section through the female connecting element at a distance from an upper end of the female connecting element.

12. The plug-in connection according to claim 1, wherein one or more female connecting elements are arranged on an electrical vehicle.

13. A use of a plug-in connection according to claim 1 to connect power supply lines, in particular in the charging of an electrical vehicle.

14. A method for connecting in particular electrical lines by means of a plug-in connection, wherein at least one male connecting element is received by at least one female connecting element in an interlocking manner and the connecting elements are detachably frictionally connected while in interlocking contact, wherein a coaxially tapered region of the male connecting element is connected to the female connecting element, after which at least one contact body of the male connecting element is released from a position within the male connecting element and slid into a position protruding from the male connecting element, in order to connect the contact body of the male connecting element to at least one contact layer of the female connecting element.

15. The method according to claim 14, wherein, in an interlocking connection of the at least one contact body to the at least one contact layer in a contact region within the female connecting element, the two connecting elements are automatically detachably frictionally connected in particular by a spring.

16. The method according to claim 14, wherein at least one contact body of the male connecting element that is embodied in an essentially round manner in a cross-section through said element is slid into at least one recess of the female connecting element that is embodied in an essentially round manner in a cross-section through said element, in order to connect the contact body to the contact layer of the female connecting element, which contact layer is arranged in the recess.

17. The method according to claim 14, wherein the connecting elements are frictionally connected by an application of a pressure to an upper side of the male connecting element.

18. The method according to claim 14, wherein, after the interlocking connection of the at least one contact body to the at least one contact layer and the frictional connection of the connecting elements, electrical energy is transmitted.

19. The method according to claim 18, wherein, after a completion of the transmission of electrical energy, the frictional connection is preferably automatically released.

* * * * *